(12) United States Patent
Lee et al.

(10) Patent No.: US 12,307,954 B2
(45) Date of Patent: *May 20, 2025

(54) FULL-SCREEN DISPLAY DEVICE WITH UNIT PIXEL HAVING FUNCTION FOR EMITTING AND RECEIVING LIGHT

(71) Applicant: Guangzhou Tyrafos Semiconductor Technologies Co., Ltd., Guangzhou (CN)

(72) Inventors: Chun-Yu Lee, New Taipei (TW); Jun-Wen Chung, Tainan (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,727

(22) Filed: Nov. 6, 2023

(65) Prior Publication Data
US 2024/0193984 A1  Jun. 13, 2024

Related U.S. Application Data

(60) Provisional application No. 63/431,332, filed on Dec. 9, 2022.

(51) Int. Cl.
*G06V 40/13*     (2022.01)
*G06F 21/32*    (2013.01)
(Continued)

(52) U.S. Cl.
CPC ............... *G09G 3/32* (2013.01); *G06F 21/32* (2013.01); *G06V 40/1318* (2022.01);
(Continued)

(58) Field of Classification Search
CPC ...... G09G 3/32; G06V 40/1318; H10K 59/65; H10K 59/879; H10K 59/877; H10K 59/873; G06F 21/32
See application file for complete search history.

(56) References Cited

U.S. PATENT DOCUMENTS

2021/0334500 A1* 10/2021 Huang ................. G06V 10/145

FOREIGN PATENT DOCUMENTS

CN   108258024 A  *  7/2018 ........... G06K 9/0004
JP   H06325158 A  * 11/1994 ......... G06V 40/1318
(Continued)

*Primary Examiner* — Stephen G Sherman

(57) ABSTRACT

A full-screen display device has unit pixels having function for emitting and receiving light, including a water-oxygen barrier layer, a protective panel, a plurality of unit pixels, a light-shielding layer, and a plurality of lens. At least one of the unit pixels has a light-emitting area inside the unit pixels, and has a light-sensing area inside or outside the unit pixels. For biometrics recognition, the light-emitting area emits an incident light, which penetrates through the water-oxygen barrier layer and scatters outwardly by at least one of the lenses. The scattered incident light penetrates through the protective panel, and is reflected by a test object. The reflected light penetrates through the protective panel and is converged by at least one of the lenses. The converged reflected light penetrates through the water-oxygen barrier, and the light-sensing area receives and converts the reflected light to an image electrical signal.

4 Claims, 20 Drawing Sheets

(51) Int. Cl.
*G09G 3/32* (2016.01)
*H10K 59/65* (2023.01)
*H10K 59/80* (2023.01)

(52) U.S. Cl.
CPC ........... *H10K 59/65* (2023.02); *H10K 59/877* (2023.02); *H10K 59/879* (2023.02); *H10K 59/873* (2023.02)

(56) References Cited

FOREIGN PATENT DOCUMENTS

WO    WO-2020030130 A1 *   2/2020   ......... G06V 40/1318
WO    WO-2022141454 A1 *   7/2022   ......... G02F 1/13338

* cited by examiner

FULL-SCREEN DISPLAY DEVICE WITH UNIT PIXEL HAVING FUNCTION FOR EMITTING AND RECEIVING LIGHT

CROSS-REFERENCE TO RELATED APPLICATION

This application claims priority of U.S. provisional application No. 63/431,332, filed on Dec. 9, 2022, the content of which is incorporated herein in its entirety by reference.

BACKGROUND OF THE INVENTION

1. Field of the Invention

The present invention relates generally to a full-screen display device, and more particularly, to a full-screen display device with unit pixels having function for emitting and receiving light.

2. The Prior Arts

With the innovation of mobile phone technology and the demands of continuous improvement from mobile phone users, to achieve a better user experience, the display screen of smart phones has developed towards a full-screen design. In order to provide unlocking recognition, under-screen optical fingerprint or palmprint recognition is a common solution currently on the market. Not only in the application field of smartphones, but also in building security system and corporate attendance system based on optical fingerprint or palmprint recognition system.

Current under-screen optical fingerprint or palmprint recognition is mainly lens-based. The optical lens module is placed under the organic light-emitting diode (OLED) screen to detect changes in fingerprints or palmprints pressed on the screen.

However, lens-based under-screen optical fingerprint or palmprint recognition must be placed below the display screen to sense the light reflected from the fingers or palms through the light-transmitting gaps between pixels. With the evolution of organic light-emitting diodes, the increase in screen resolution has led to a decrease in screen transmittance and the development trend of large-scale fingerprint or palmprint recognition. The conventional lens-based under-screen optical fingerprint or palmprint recognition is often considered no longer possible to meet needs.

SUMMARY OF THE INVENTION

A primary objective of the present invention is to provide a full-screen display device with unit pixels having function for receiving and transmitting light, which can provide half-screen or full-screen large-area optical biometric recognition technology to realize the full-screen biometric pressing function.

In order to achieve the aforementioned objective, the present invention provides a full-screen display device with unit pixels having function for transmitting and receiving light, including a water-oxygen barrier layer; a protective panel, disposed above the water-oxygen barrier layer; a plurality of unit pixels, arranged below the water-oxygen barrier layer, and at least one of the unit pixels having a light-emitting area inside the unit pixels and at least one of the unit pixels having a light-sensing area inside or outside the unit pixels; a light-shielding layer, disposed on a first surface of the water-oxygen barrier layer and having a plurality of openings to expose at least part of each of the unit pixels; and a plurality of lenses, disposed on the first surface of the water-oxygen barrier layer and located in the openings; wherein, when the full-screen display device performs biometric recognition, the light-emitting area emits an incident light, the incident light passing through the water-oxygen barrier layer and scattering outwardly through at least one of the lenses, and the scattered incident light passing through the protective panel and then reflected by a test object to generate a reflected light; the reflected light passing through the protective panel, entering at least one of the lenses and being converged; and the converged reflected light travels along a converged light path and passes through the water-oxygen barrier layer to be received by the light-sensing area and converted into an image electrical signal.

In a preferred embodiment, each lens is a microlens or a meta-lens.

In a preferred embodiment, a size of the light-sensing area is obtained through the following conditions: (1) the curved surface of the microlens is a spherical surface, an aspherical surface or an asymmetric free-form surface, or the meta-lens comprises a nanometer microstructure;

$$\left(\frac{B}{A}\right) \times 0.001 \text{ mm} < D < \left(\frac{A}{B}\right) \times 1000 \text{ mm}; \tag{2}$$

$$\left(\frac{B}{3.5 \times A}\right) \times 0.001 \text{ mm} < H < \left(\frac{7.0 \times A}{B}\right) \times 10 \text{ mm}; \tag{3}$$

$$0.00005 < \frac{B}{A} < 0.99995; \tag{4}$$

$$\left(\frac{B}{A}\right) \times 0.001 \div \sqrt{2} \text{ mm} < R < \left(\frac{A}{B}\right) \times 1000 \text{ m}; \text{ and} \tag{5}$$

$$Z2 \leq Z1; \tag{6}$$

where A is the size of a unit pixel, B is the size of the light-sensing area, D is the thickness of the water-oxygen barrier layer, H is the height of each microlens, R is the curvature of each microlens, and Z1 is the diameter of each microlens, and Z2 is a diameter of each opening.

In a preferred embodiment, the full-screen display device further includes an organic light-emitting diode (OLED), disposed on a second surface of the water-oxygen barrier layer and comprising the unit pixels; wherein, each unit pixel comprising a cathode, an electron injection layer, an electron transport layer, a hole blocking layer, a light-emitting layer, a hole transport layer, a hole injection layer, and an anode, the light-emitting layer defining the light-emitting area, the anode having a driving layer and a light-sensing layer, the driving layer being electrically connected to a driving circuit, the light-sensing layer being electrically connected to a photocurrent sensing circuit and defining the light-sensing area.

In a preferred embodiment, the driving layer is arranged around the outside of the light-sensing layer along a circumferential direction, and the light-sensing layer is arranged on the converged light path of at least one of the lenses and is located on center of the driving layer.

In a preferred embodiment, the full-screen display device further includes at least one photodiode, disposed outside at least one of the unit pixels and defining the light-sensing area.

In a preferred embodiment, the at least one photodiode is disposed below at least one of the unit pixels.

In a preferred embodiment, the at least one photodiode is disposed on the converged light path of at least one of the lenses and close to the center of at least one of the unit pixels.

In a preferred embodiment, the at least one photodiode is a light-sensing layer element of amorphous silicon or polycrystalline silicon.

In a preferred embodiment, the full-screen display device further includes an organic light-emitting diode (OLED), disposed on a second surface of the water-oxygen barrier layer and comprising the unit pixels; each unit pixel comprising a cathode, an electron injection layer, an electron transport layer, a hole blocking layer, a light-emitting layer, a hole transport layer, a hole injection layer, and an anode; the light-emitting layer defining the light-emitting area, the anode being electrically connected to a driving circuit, and the at least one photodiode being electrically connected to a photocurrent sensing circuit.

The effect of the present invention is that the full-screen display device of the present invention can emit the incident light through the internal light-emitting area of each unit pixel, and then converge the reflected light to the internal or external light-sensing areas of the same unit pixel through each lens, so that each unit pixel performs the functions for emitting and receiving light. Furthermore, the difference in the size of the light-sensing area can block the crosstalk of biometric features, thereby obtaining clear biometric images. As such, the full-screen display device of the present invention can provide half-screen or full-screen large-area optical biometric recognition technology to realize the full-screen biometric pressing function.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
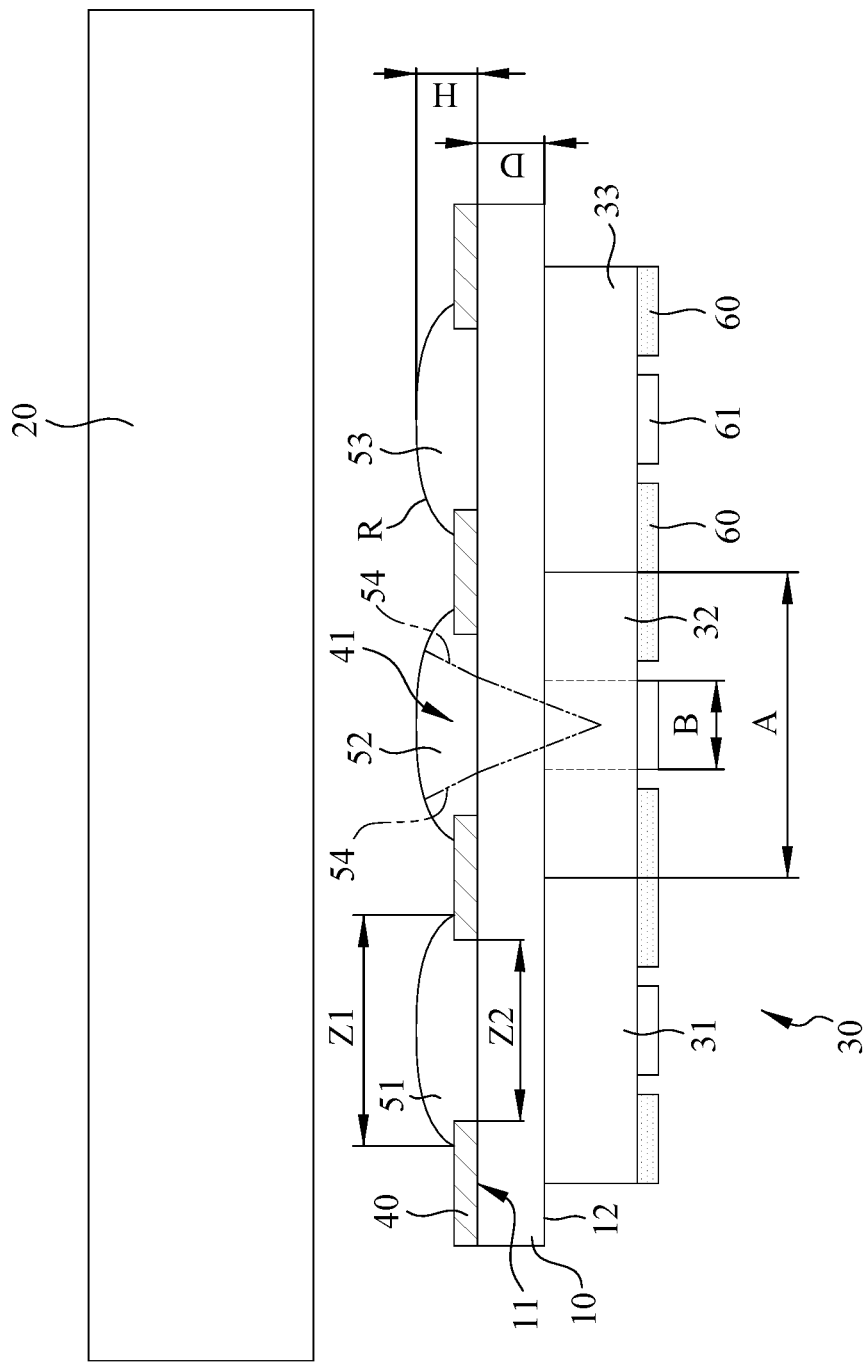
FIG. 1 is a schematic structural diagram of the first embodiment and the second embodiment of the present invention.

FIG. 1 is a schematic structural diagram of the first embodiment and the second embodiment of the present invention. As shown in FIG. 1, the present invention provides a full-screen display device with unit pixels having functions for transmitting and receiving light, including a water-oxygen barrier layer 10, a protective panel 20, a plurality of unit pixels 31, 32, 33, and a light-shielding layer 40, and a plurality of lenses 51, 52, 53. The protective panel 20 is disposed above the water-oxygen barrier layer 10. The unit pixels 31, 32, 33 are disposed below the water-oxygen barrier layer 10, and the inside of the unit pixels 31, 32, 33 is provided with a light-emitting area 60 and a light-sensing area 61. The light-shielding layer 40 is disposed on a first surface 11 of the water-oxygen barrier layer 10 and has a plurality of openings 41 that expose at least part of each of the unit pixels 31, 32, 33. The lenses 51, 52, 53 are disposed on the first surface 11 of the water-oxygen barrier layer 10 and located in the openings 41.

When the full-screen display device of the present invention is used as a display screen, the light-emitting areas 60 of the unit pixels 31, 32, 33 emit the incident light, which passes through the water-oxygen barrier layer 10 and scatters outwardly through the lenses 51, 52, 53, the scattered incident light passes through the protective panel 20 and emits outwardly, achieving the effect of full-screen display.

Figure 2:
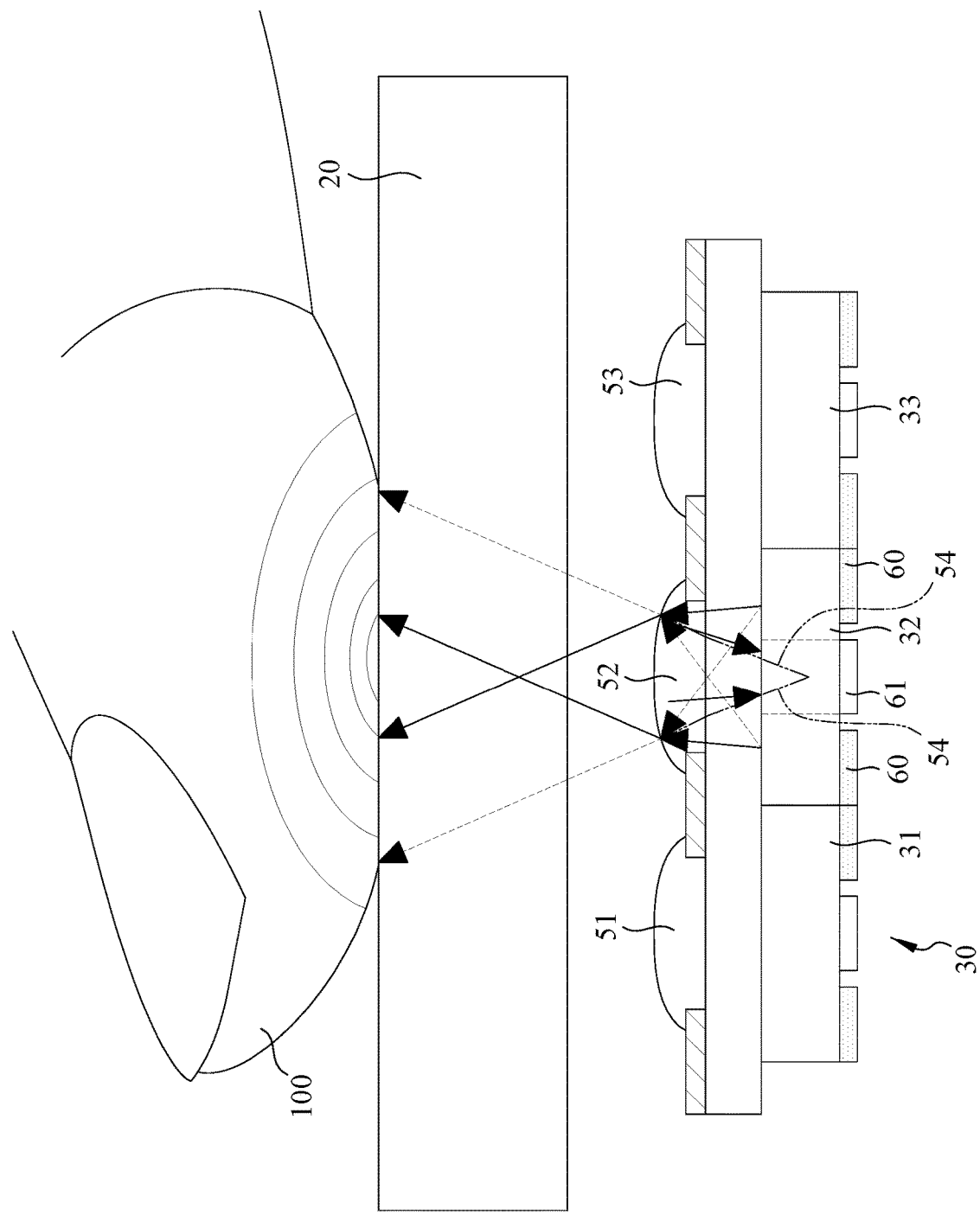
FIG. 2 is a schematic diagram of biometric recognition according to the first and second embodiments of the present invention.

FIG. 2 is a schematic diagram of biometric recognition according to the first and the second embodiments of the present invention. As shown in FIG. 2, when the full-screen display device of the present invention performs biometric recognition, the light-emitting area of the unit pixel 32 emits an incident light, which passes through the water-oxygen barrier layer 10 and is scattered outwardly through the lens 52. The outwardly scattered incident light passes through the protective panel 20 and is reflected by an object 100 to generate a reflected light, and the reflected light passes through the protective panel 20 and then enters the lens 52.

The lens 52 converges the reflected light. The converged reflected light passes through the water-oxygen barrier layer 10 along a converged light path 54 of the lens 52 and then passes through the light-sensing area 61 of the unit pixel 32 to be received and converted into an image electrical signal.

In some embodiments, when the full-screen display device of the present invention performs biometric recognition, some or all of the light-emitting areas 60 of the unit pixels 31, 32, and 33 emit the incident light, and the incident light passes through the water-oxygen barrier layer 10 and is scattered outwardly through some or all of the lenses 51, 52, 53. The incident light scattered outwardly passes through the protective panel 20 and is reflected by a test object 100 to generate a reflected light. The reflected light passes through the protective panel 20, enters some or all of the lenses 51, 52, 53, some or all of the lenses 51, 52, 53 converge the reflected light, and the converged reflected light passes through the water-oxygen barrier layer 10 along the converged light path 54 of some or all of the lenses 51, 52, 53, and is then received by the light-sensing areas 61 of some or all of the unit pixels 31, 32, 33 to be converted into an image electrical signal.

The test object 100 shown in FIG. 2 is a finger, so the biometric feature is a fingerprint. In a preferred embodiment, the test object 100 can also be a palm, and thus the biometric feature can be veins or palm prints.

The light-shielding layer 40 can shield external scattered light, and the light-shielding layer 40 can be formed of any material that can shield light. For example, the light-shielding material may include a light-absorbing material, but is not limited thereto. For example, the material of the light-shielding layer 40 may include black ink or black photoresist. In addition, the light-shielding layer 40 may be formed on the surface by printing. However, the material, color and method of forming the light-shielding layer 40 on the surface can be modified according to applications and are not limited to the above.

As shown in FIG. 1, in the first embodiment, each lens 51, 52, 53 is a micro lens. In a preferred embodiment, each lens 51, 52, 53 may also be a meta-lens. Both microlenses and meta-lenses provide the functions of scattering the incident light outwardly and converging the reflected light. The operation principles are well-known common knowledge, and will not be described in detail herein.

As shown in FIG. 1, the size of the light-sensing area 61 is obtained through the following conditions: (1) the curved surface of the microlens is a spherical surface, an aspherical surface or an asymmetric free-form surface (not shown in the figure), or the meta-lens comprises a nanometer microstructure;

$$\left(\frac{B}{A}\right) \times 0.001 \text{ mm} < D < \left(\frac{A}{B}\right) \times 1000 \text{ mm}; \quad (2)$$

$$\left(\frac{B}{3.5 \times A}\right) \times 0.001 \text{ mm} < H < \left(\frac{7.0 \times A}{B}\right) \times 10 \text{ mm}; \quad (3)$$

$$0.00005 < \frac{B}{A} < 0.99995; \quad (4)$$

$$\left(\frac{B}{A}\right) \times 0.001 \div \sqrt{2} \text{ mm} < R < \left(\frac{A}{B}\right) \times 1000 \text{ m}; \text{ and} \quad (5)$$

$$Z2 \leq Z1; \quad (6)$$

where A is the size of a unit pixel, B is the size of the light-sensing area 61, D is the thickness of the water-oxygen barrier layer 10, H is the height of each microlens, R is the curvature of each microlens, and Z1 is the diameter of each microlens, and Z2 is a diameter of each opening 41. Through the above conditions, the light-sensing area 61 has a smaller size.

More specifically, the size of the light-sensing area 61 has a great impact on the occurrence of cross talk. In principle, the smaller the size of the light-sensing area 61 (for example, the size of the light-sensing area 61 is smaller than 1/10 of the size of the unit pixel), the smaller the impact of crosstalk. With the lenses 51, 52, 53 to converge the reflected light in the light-sensing area 61, the light energy of the light-emitting areas 60 of the unit pixel 31, 32, 33 will not be decreased by the small size of the light-sensing area 61, but instead can achieve a better effect of blocking crosstalk. What is important is that the smaller the size of the light-sensing area 61 is, the less it will affect the color and viewing angle of the unit pixels 31, 32, 33 under normal display.

As shown in FIG. 1, in the first and second embodiments, the full-screen display device of the present invention further includes an organic light-emitting diode 30. The organic light-emitting diode 30 is disposed on a second surface 12 of the water-oxygen barrier layer 10 and also includes the unit pixels 31, 32, 33. The unit pixels 31, 32, 33 include a plurality of red light unit pixels, a plurality of blue light unit pixels, and a plurality of green light unit pixels. When the full-screen display device of the present invention is used as a display screen, the red unit pixels emit red incident light (wavelength between 620 nm and 750 nm), and the blue unit pixels emit blue incident light (wavelength between 430 nm and 495 nm), these green light unit pixels emit green incident light (wavelength between 495 nm and 570 nm). The incident red light, the incident blue light, and the incident green light pass through the water-oxygen barrier layer 10 and are scattered outwardly through the lenses 51, 52, 53 respectively. The incident light passes through the protective panel 20 and is emitted outwardly, achieving the effect of full-screen display.

Figure 3A:
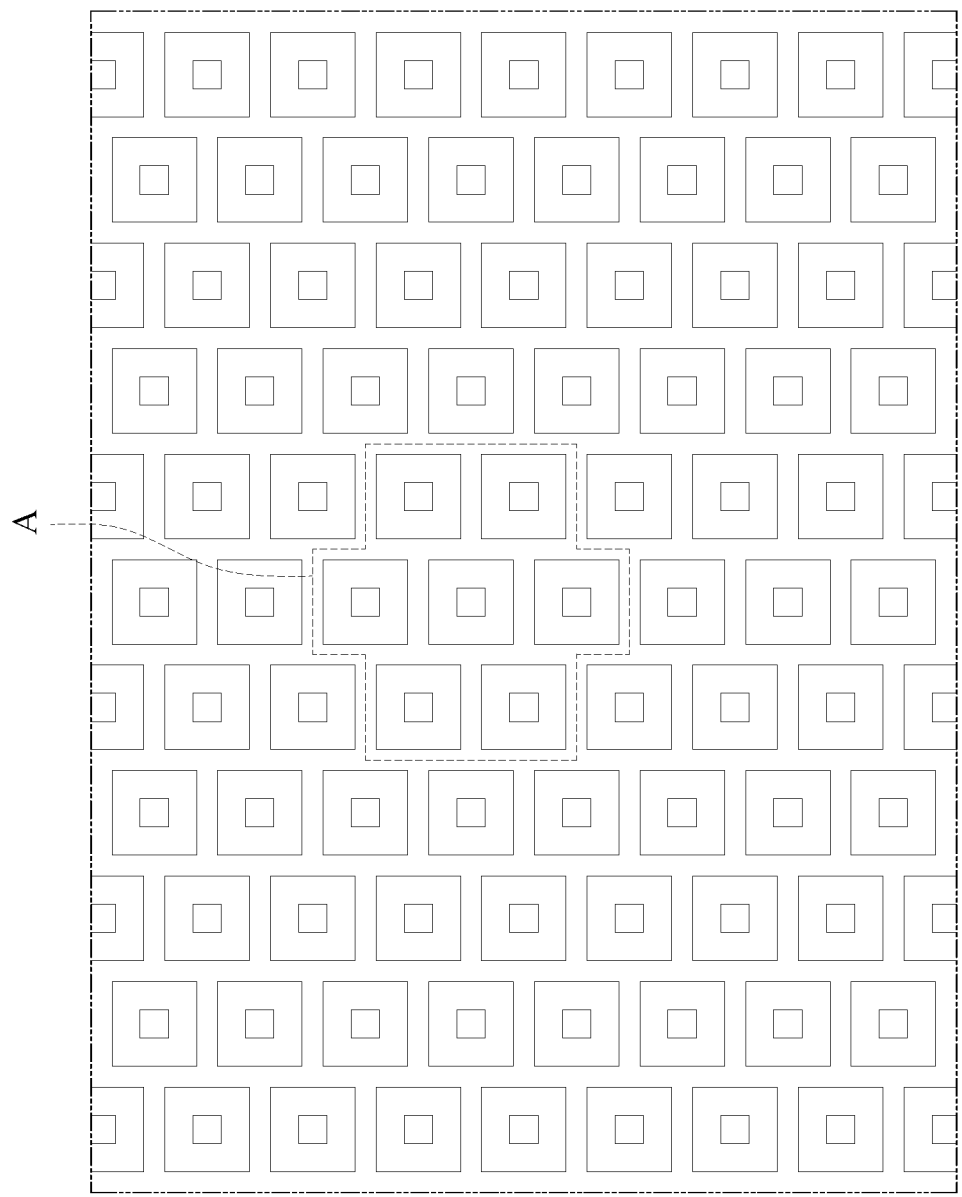
FIG. 3A is a schematic diagram of the arrangement of unit pixels in the first and second embodiments of the present invention.
Figure 3B:
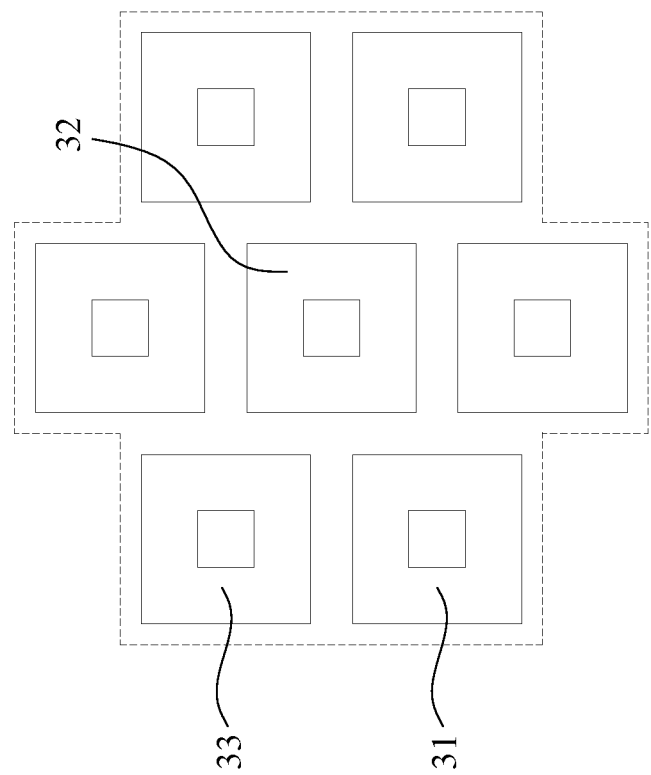
FIG. 3B is a schematic diagram of area A of FIG. 3A.

FIG. 3A is a schematic diagram of the arrangement of unit pixels 31, 32, 33 in the first and second embodiments of the present invention, and FIG. 3B is a schematic diagram of area A of FIG. 3A. As shown FIGS. 3A, 3B and also referring to FIGS. 1, 2, in the first and the second embodiments, the unit pixels 31, 32, 33 have the same area, and the inside of each of the unit pixels 31, 32, 33 has the light-emitting area 60 and the light-sensing area 61.

Figure 4A:
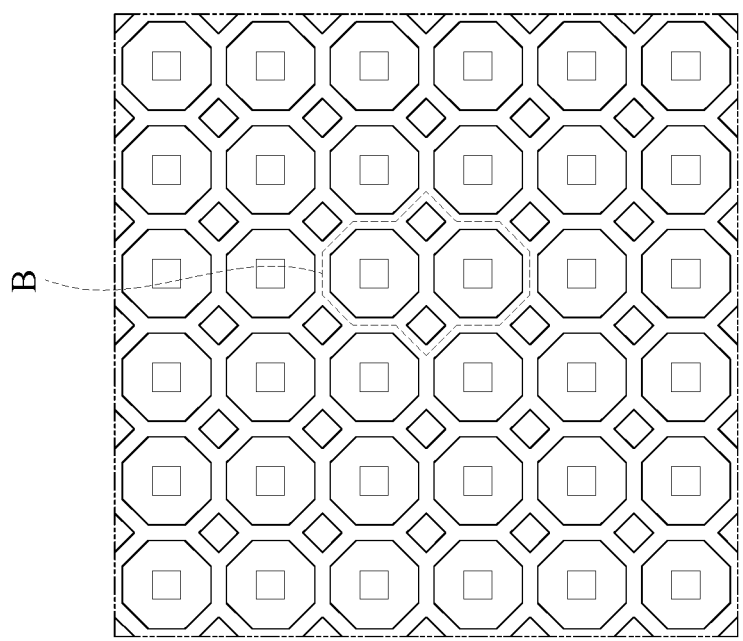
FIG. 4A is a schematic diagram of the arrangement of unit pixels according to some embodiments of the present invention.
Figure 4B:
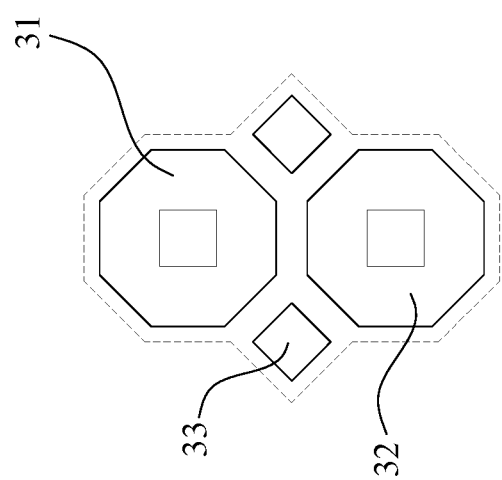
FIG. 4B is a schematic diagram of area B of FIG. 4A.

FIG. 4A is a schematic diagram of the arrangement of unit pixels 31, 32, 33 according to some embodiments of the present invention, and FIG. 4B is a schematic diagram of area B of FIG. 4A. As shown in FIGS. 4A, 4B, in some embodiments, the red light unit pixel 31 and the blue light unit pixel 32 have a larger area, and the green light unit pixel 33 has a smaller area. Therefore, the larger red light unit pixel 31 and the blue light unit pixel 32 both have a light-emitting area 60 and a light-sensing area 61 inside the blue light unit pixel 32, and the smaller green light unit pixel 33 only has a light-emitting area 60 but no light-sensing area 61 inside the smaller green light unit pixel 33.

In fact, there are various possible arrangements of the unit pixels 31, 32, and 33 and are not limited to the two aforementioned arrangements.

Figure 5:
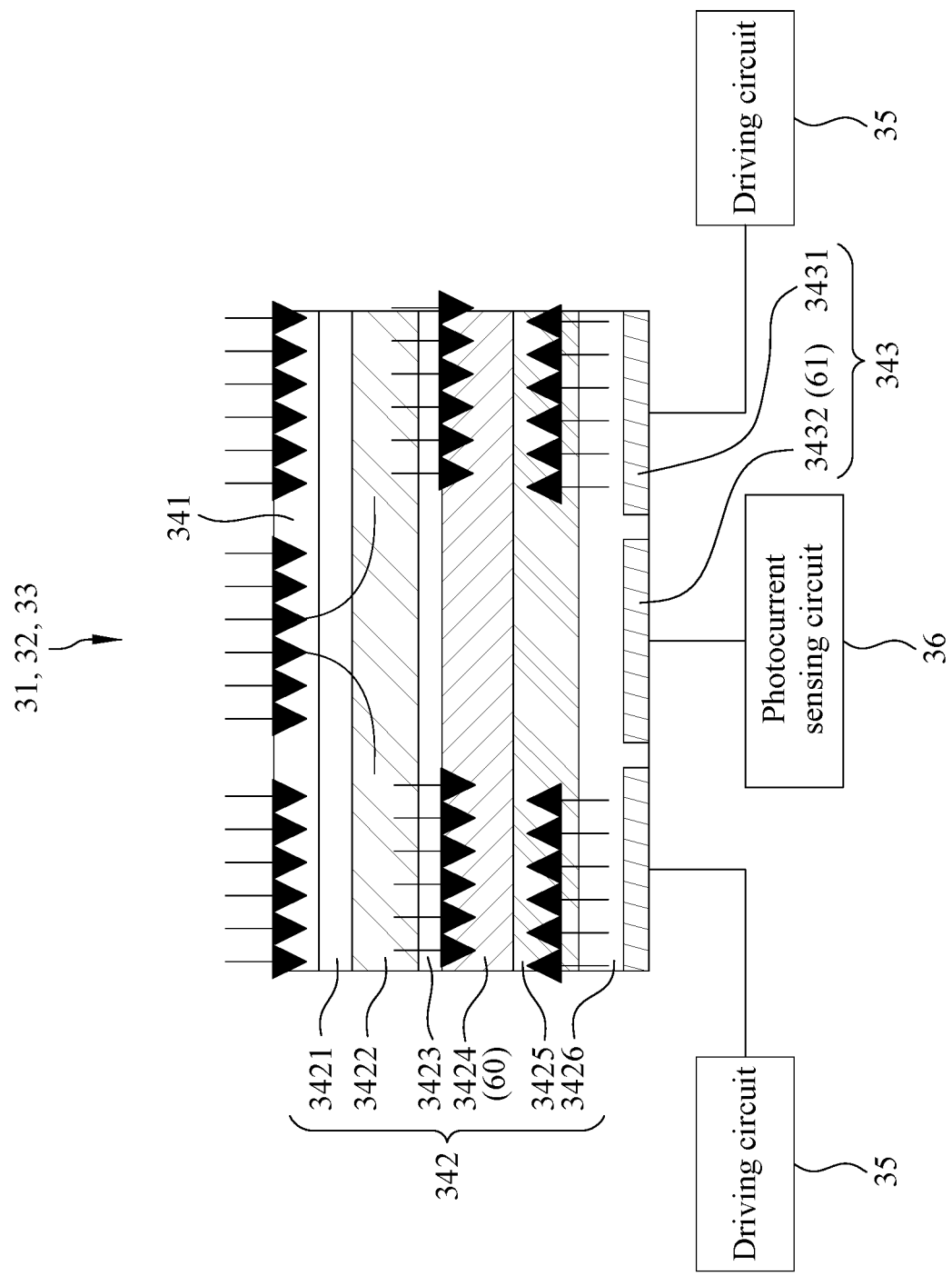
FIG. 5 is a schematic diagram of the driving circuit in the first and second embodiments of the present invention driving the light-emitting layer of each unit pixel as the light-emitting area to emit the incident light.
Figure 6:
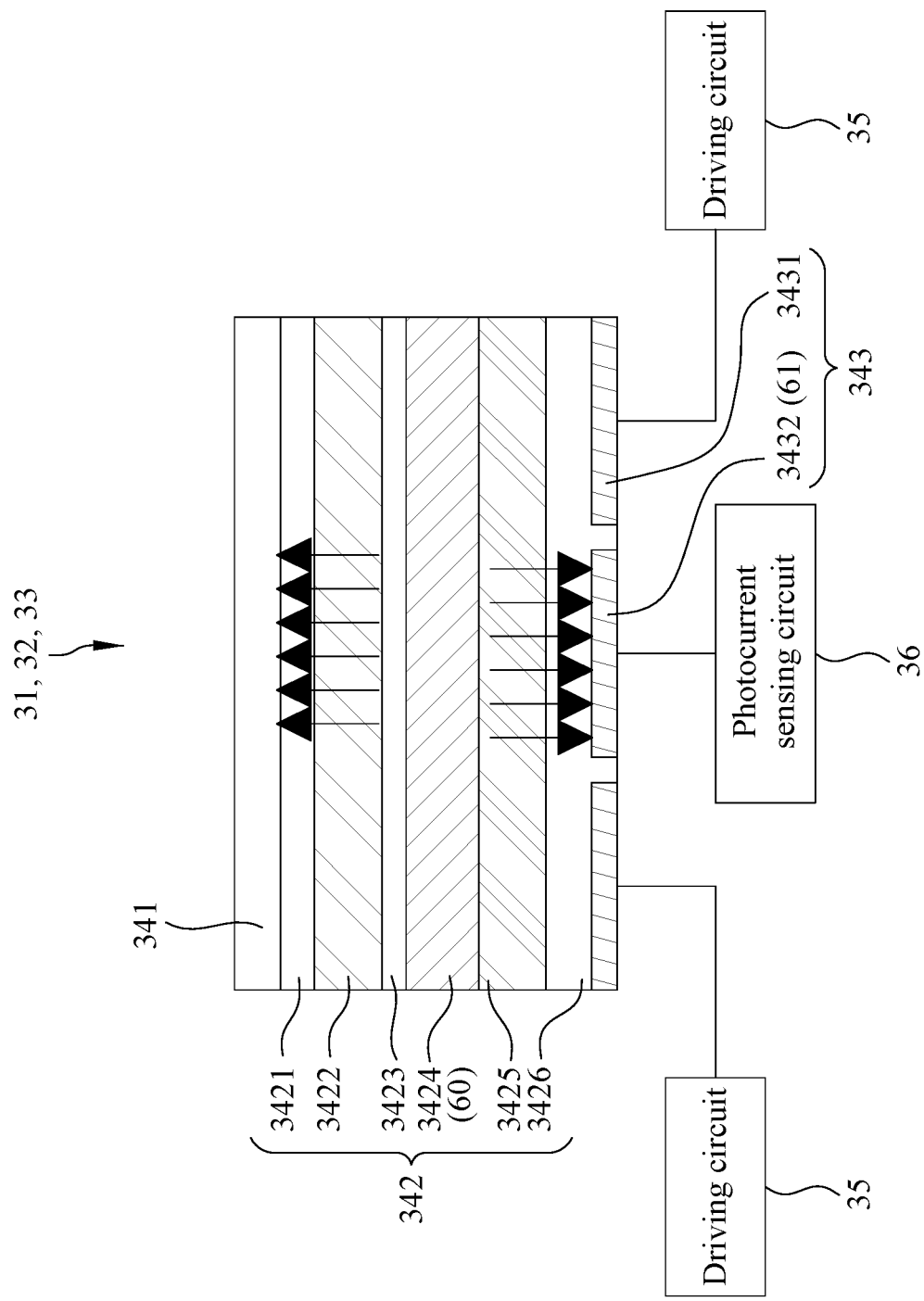
FIG. 6 is a schematic diagram of the photocurrent sensing circuit driving the light-sensing layer of each unit pixel as the light-sensing area to receive the reflected light according to the first and second embodiments of the present invention.

FIG. 5 is a schematic diagram of the driving circuit 35 driving the light-emitting layer 3424 of each unit pixel 31, 32, 33 as the light-emitting area 60 to emit the incident light according to the first and second embodiments of the present invention. FIG. 6 is a schematic diagram of the photocurrent sensing circuit 36 driving the light-sensing layer 3432 of each unit pixel 31, 32, 33 of the light-sensing area 61 to receive the reflected light according to the first and second embodiments of the present invention. As shown in FIGS. 5 and 6, each unit pixel 31, 32, 33 includes a cathode 341, an electron injection layer 3421, an electron transport layer 3422, a hole blocking layer 3423, a light-emitting layer 3424, a hole transport layer 3425, a hole injection layer 3426, and an anode 343. The electron injection layer 3421 is arranged below the cathode 341, the electron transport layer 3422 is arranged below the electron injection layer 3421, and the hole blocking layer 3423 is arranged below the electron transport layer 3422, the light-emitting layer 3424 is disposed below the hole blocking layer 3423, the hole transport layer 3425 is disposed below the light-emitting layer 3424, the hole injection layer 3426 is disposed below the hole transport layer 3425, and the anode 343 is disposed below the hole transport layer 3425. The light-emitting layer 3424 defines the light-emitting area 60. The anode 343 includes a driving layer 3431 and a light-sensing layer 3432. The driving layer 3431 is electrically connected to a driving circuit 35, and the light-sensing layer 3432 is electrically connected to a photocurrent detection circuit 36 and defines a light-sensing area 61.

As shown in FIG. 5, the driving circuit 35 drives the driving layer 3431 of the anode 343 to generate holes. The holes enter the hole transport layer 3425 through the hole injection layer 3426, and the hole transport layer 3425 transports the holes to the light-emitting layer 3424 and the holes are blocked by the hole blocking layer 3423. As shown in FIG. 5, the cathode 341 generates electrons, the electrons enter the electron transport layer 3422 through the electron injection layer 3421, and the electron transport layer 3422 transports the electrons to the light-emitting layer 3424. The electrons and holes recombine in the light-emitting layer 3424 to emit photons to generate the incident light. At this point, the photocurrent sensing circuit 36 does not drive the light-sensing layer 3432 to receive the reflected light.

As shown in FIG. 6, the photocurrent sensing circuit 36 drives the light-sensing layer 3432 to receive the reflected light, while the driving circuit 35 does not drive the driving layer 3431 of the anode 343 to generate holes so as to prevent the light-emitting layer 3424 from emitting incident light.

Figure 7:
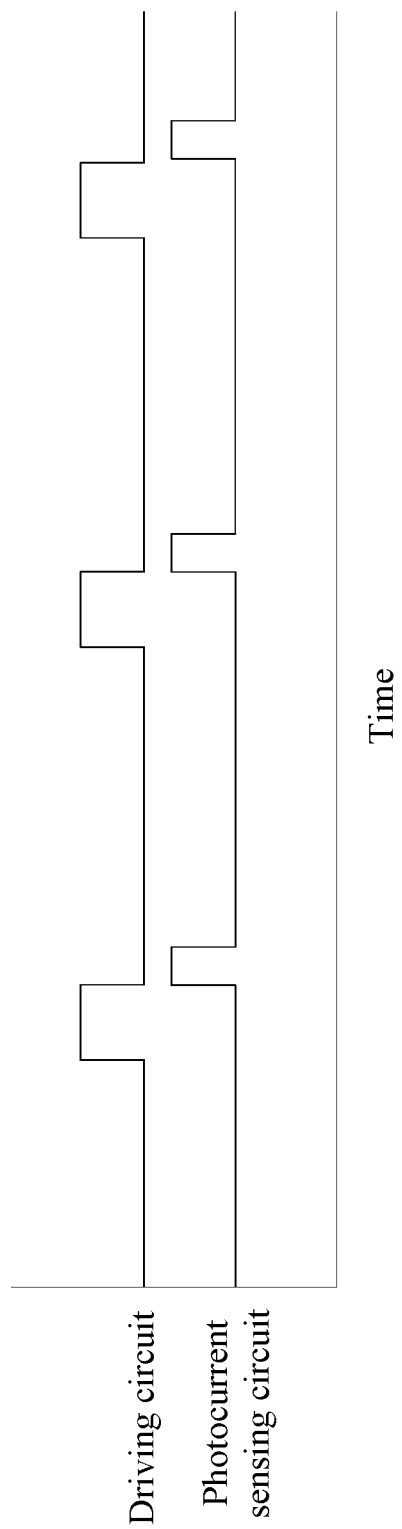
FIG. 7 is an operation timing diagram of the driving circuit and the photocurrent sensing circuit of the first and second embodiments of the present invention.

FIG. 7 is an operation timing diagram of the driving circuit 35 and the photocurrent sensing circuit 36 of the first and second embodiments of the present invention. As shown in FIG. 7, and also referring to FIGS. 5 and 6, the driving circuit 35 starts to drive the light-emitting layer 3424 to emit the incident light at regular intervals. After the light-emitting layer 3424 emits incident light for a period of time, the driving circuit 35 stops driving the light-emitting layer 3424 to emit the incident light. As shown in FIG. 7, the photocurrent sensing circuit 36 starts to drive the light-sensing layer 3432 to receive the reflected light at regular intervals. After the light-sensing layer 3432 receives the reflected light for a period of time, the photocurrent sensing circuit 36 stops driving the light-sensing layer 3432 to receive the reflected light. As shown in FIG. 7, and also referring to FIG. 5, during the period when the driving circuit 35 drives the light-emitting layer 3424 to emit the incident light, the photocurrent sensing circuit 36 does not drive the light-sensing layer 3432 to receive the reflected light. As shown in FIG. 7, and also referring to FIGS. 5 and 6, when the driving circuit 35 stops driving the light-emitting layer 3424 to emit the incident light, the photocurrent sensing circuit 36 immediately starts driving the light-sensing layer 3432 to receive the reflected light. As shown in FIG. 7, and also referring to FIG. 6, during the period when the photocurrent sensing circuit 36 drives the light-sensing layer 3432 to receive the reflected light, the driving circuit 35 does not drive the light-emitting layer 3424 to emit the incident light. In other words, the operating timing of the driving circuit 35 and the photocurrent sensing circuit 36 are completely staggered, and the two circuits will not operate at the same time. Therefore, the timing of the light-emitting layer 3424 emitting incident light and the light-sensing layer 3432 receiving the reflected light are completely staggered, ensuring that the light-sensing layer 3432 receives all reflected light.

Figure 8:
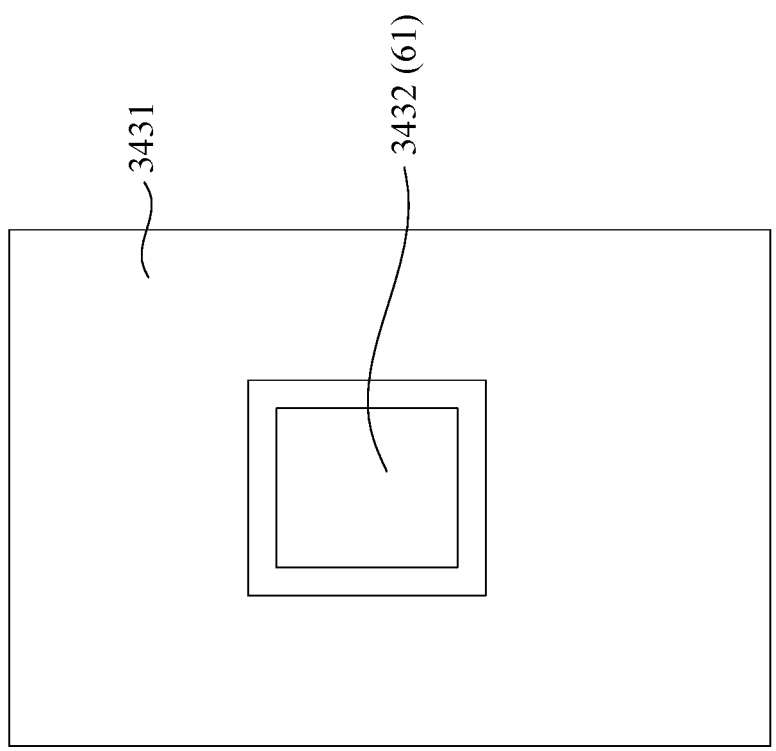
FIG. 8 is a schematic diagram of the anode according to the first and second embodiments of the present invention.

FIG. 8 is a schematic diagram of the anode 343 of the first and second embodiments of the present invention. As shown in FIG. 8, and also referring to FIGS. 1, 2 and 6, the driving layer 3431 is preferably arranged around the outside of the light-sensing layer 3432 along a circumferential direction, serving as the light-sensing layer 3432 of the unit pixels 31, 32, 33 of the light-sensing area 61, arranged on the converged light path 54 of each lens 51, 52, 53 and is located at the center of the driving layer 3431 of each unit pixel 31, 32, 33. Therefore, the wavelength of external ambient light and the wavelength of the signal light in the light-emitting area 60 will be absorbed by the light-shielding layer 40, thereby reducing the crosstalk caused by reflection and diffusion of external ambient light and the signal light in the light-emitting area 60. As such, only the converged reflected light will be focused on the light-sensing layer 3432 of each unit pixel 31, 32, 33 as the light-sensing area 61 along the converged light path 54 of each lens 51, 52, 53, thereby improving the signal-to-noise ratio (SNR).

Figure 9:
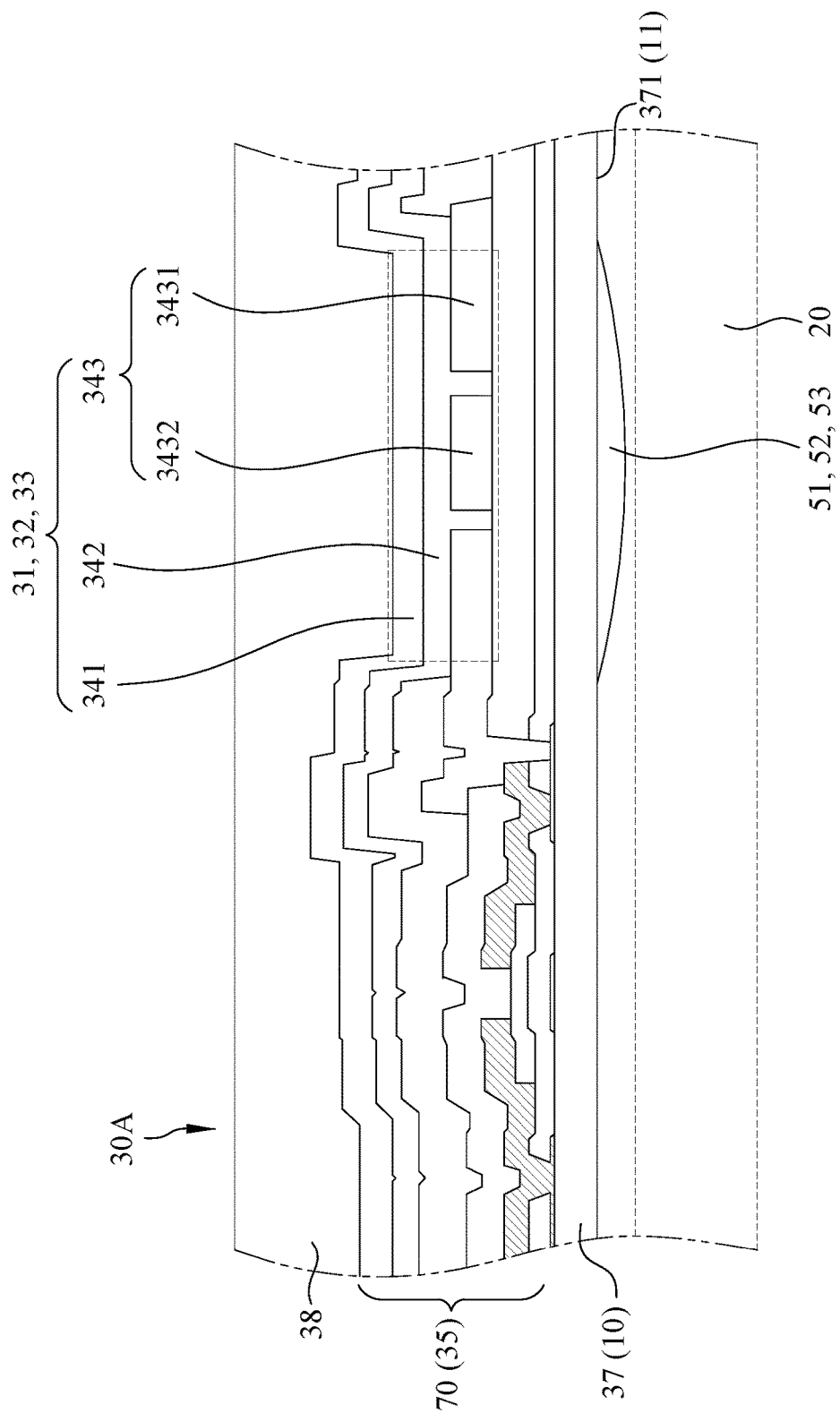
FIG. 9 is a cross-sectional view of the first embodiment of the present invention.

FIG. 9 is a cross-sectional view of the first embodiment of the present invention. As shown in FIG. 9 and also referring to FIG. 5, in the first embodiment, the organic light-emitting diode (OLED) 30A is configured with an N-channel driving thin film transistor (TFT) 70 as the driving circuit 35, and collectively includes a substrate 37 and an encapsulation layer 38. The OLED 30A also includes a pixel circuit, a planarization dielectric layer, and a bank (not shown), and the electron injection layer 3421, the electron transport layer 3422, and the hole blocking layer 3423, the light-emitting layer 3424, the hole transport layer 3425, and the hole injection layer 3426 of each unit pixel 31, 32, 33 form an organic layer 342. The substrate 37 is, for example, but not limited to, a glass substrate, a polyethylene terephthalate (PET) substrate, an olefin polymer (COP) substrate, a transparent polyimide (CPI) substrate, a polyethylene naphthalate (PEN) substrate, polycarbonate (PC) substrate, polyether styrene (PES) substrate, or polarizing film. The pixel circuit is disposed on the substrate 37, coupled to the unit pixels 31, 32, 33, and used to control the unit pixels 31, 32, 33. The planarization dielectric layer is disposed between the bottoms of the unit pixels 31, 32, 33 and the pixel circuit. The planarization dielectric layer is disposed with a bank that has been previously formed by a lithography etching process, and the anodes 343 of the unit pixels 31, 32, 33 are connected to the corresponding pixel circuit through a via hole passing between the banks. The encapsulation layer 38 is disposed on top of the unit pixels 31, 32, 33. The encapsulation layer 38 may be a single layer of inorganic encapsulation material, a multi-layer stack of inorganic encapsulation materials, or a paired stack of inorganic encapsulation materials and organic encapsulation materials. Inorganic encapsulation materials include, but are not limited to, silicon nitride (SiNx), silicon oxide (SiOx), silicon oxynitride (SiONx), aluminum oxide (AlOx) or titanium oxide (TiOx).

As shown in FIG. 9, in the first embodiment, the substrate 37 serves as the water-oxygen barrier layer 10, the protective panel 20 is disposed below the substrate 37, and the unit pixels 31, 32, 33 are disposed above the substrate 37. The light-shielding layer 40 (not shown) and the lenses 51, 52, 53 are disposed on a bottom surface 371 of the substrate 37 (i.e., the first surface 11 of the water-oxygen barrier layer 10). Therefore, the orientations of the components shown in FIGS. 1 and 9 are just upside down, so the OLED 30A of the first embodiment is the downward emitting type.

Figure 10:
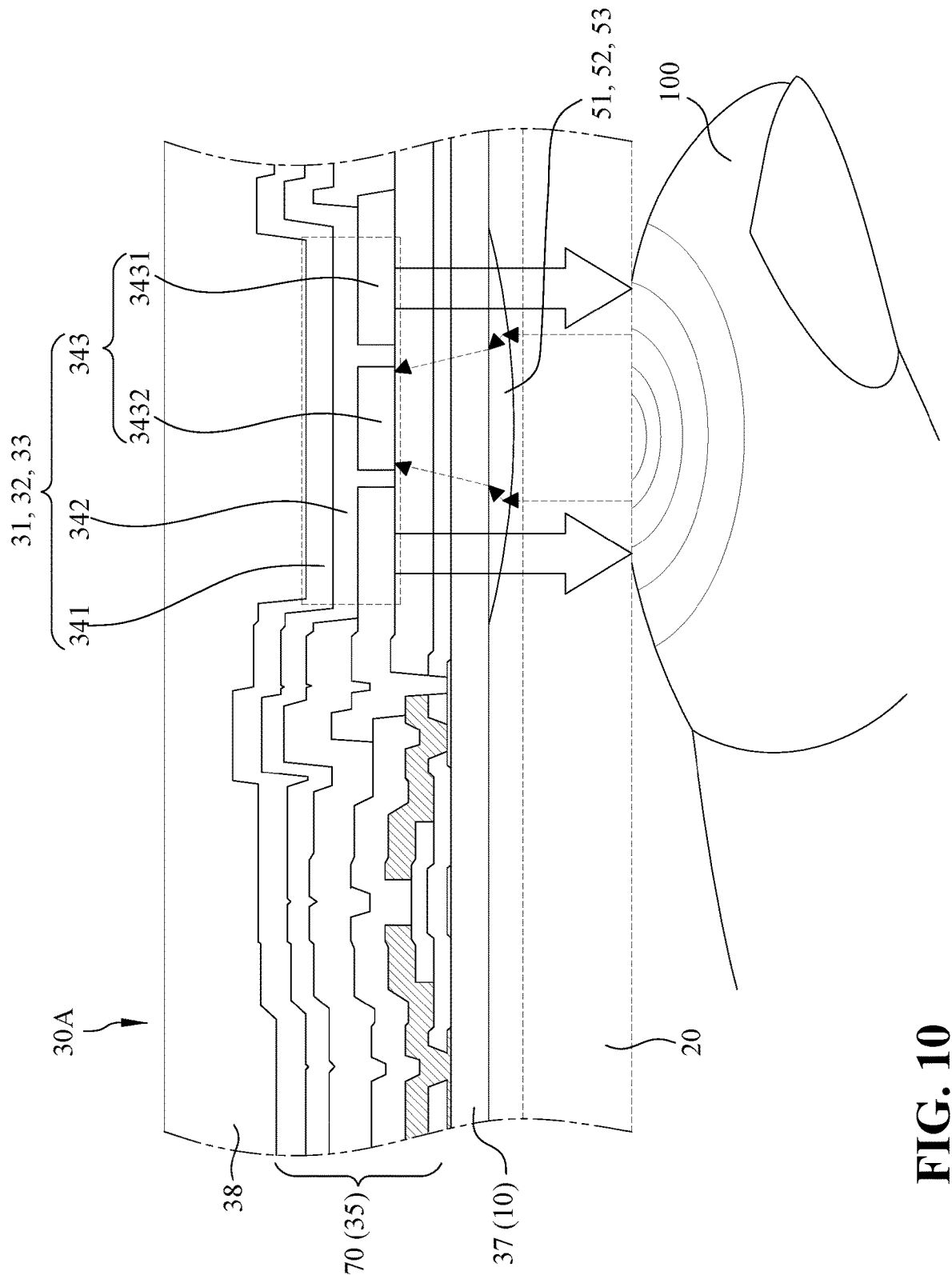
FIG. 10 is a schematic diagram of biometric recognition according to the first embodiment of the present invention.

FIG. 10 is a schematic diagram of biometric recognition according to the first embodiment of the present invention. As shown in FIG. 10, and also referring to FIGS. 2, 5 and 6, in the first embodiment, when the full-screen display device of the present invention performs biometric recognition, the light-emitting layer 3424 of the unit pixels 31, 32, 33 of the light-emitting area 60 emits the incident light downwardly, and the incident light passes downwardly through the substrate 37 (i.e., the water-oxygen barrier layer 10) and scattered outwardly through the lenses 51, 52, 53. After passing through the protective panel 20, the scattered incident light is reflected by a test object 100 to generate a reflected light. After passing through the protective panel 20, the reflected light enters and is converged by each lens 51, 52, 53. The reflected light passes through the substrate 37 (i.e., the water-oxygen barrier layer 10) along the converged light path 54 of each lens 51, 52, 53 and is then received by the light-sensing layer 3432 of each unit pixel 31, 32, 33 as the light-sensing area 61 and converted into an image electrical signal.

Figure 11:
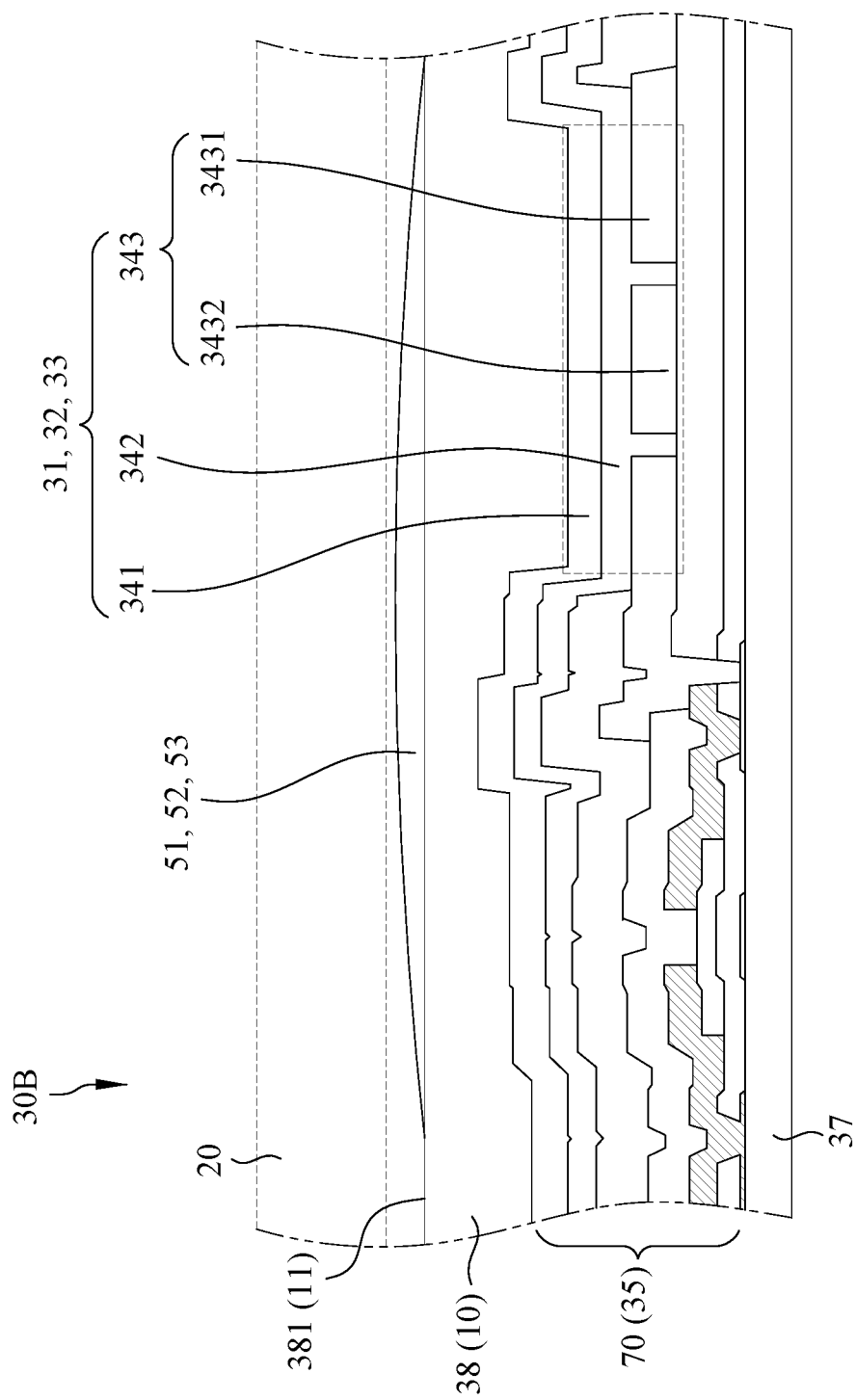
FIG. 11 is a cross-sectional view of the second embodiment of the present invention.

FIG. 11 is a cross-sectional view of the second embodiment of the present invention. As shown in FIG. 11, the differences between the second embodiment and the first embodiment are that the encapsulation layer 38 serves as the water-oxygen barrier layer 10, the protective panel 20 is disposed above the encapsulation layer 38, and the light-shielding layer 40 (not shown) and the lenses 51, 52, 53 are disposed on a top surface 381 of the encapsulation layer 38 (i.e., the first surface 11 of the water-oxygen barrier layer 10). Therefore, the orientations of the components shown in FIG. 1 and FIG. 11 are exactly the same, so the OLED 30B of the second embodiment is the upward-emitting type.

Figure 12:
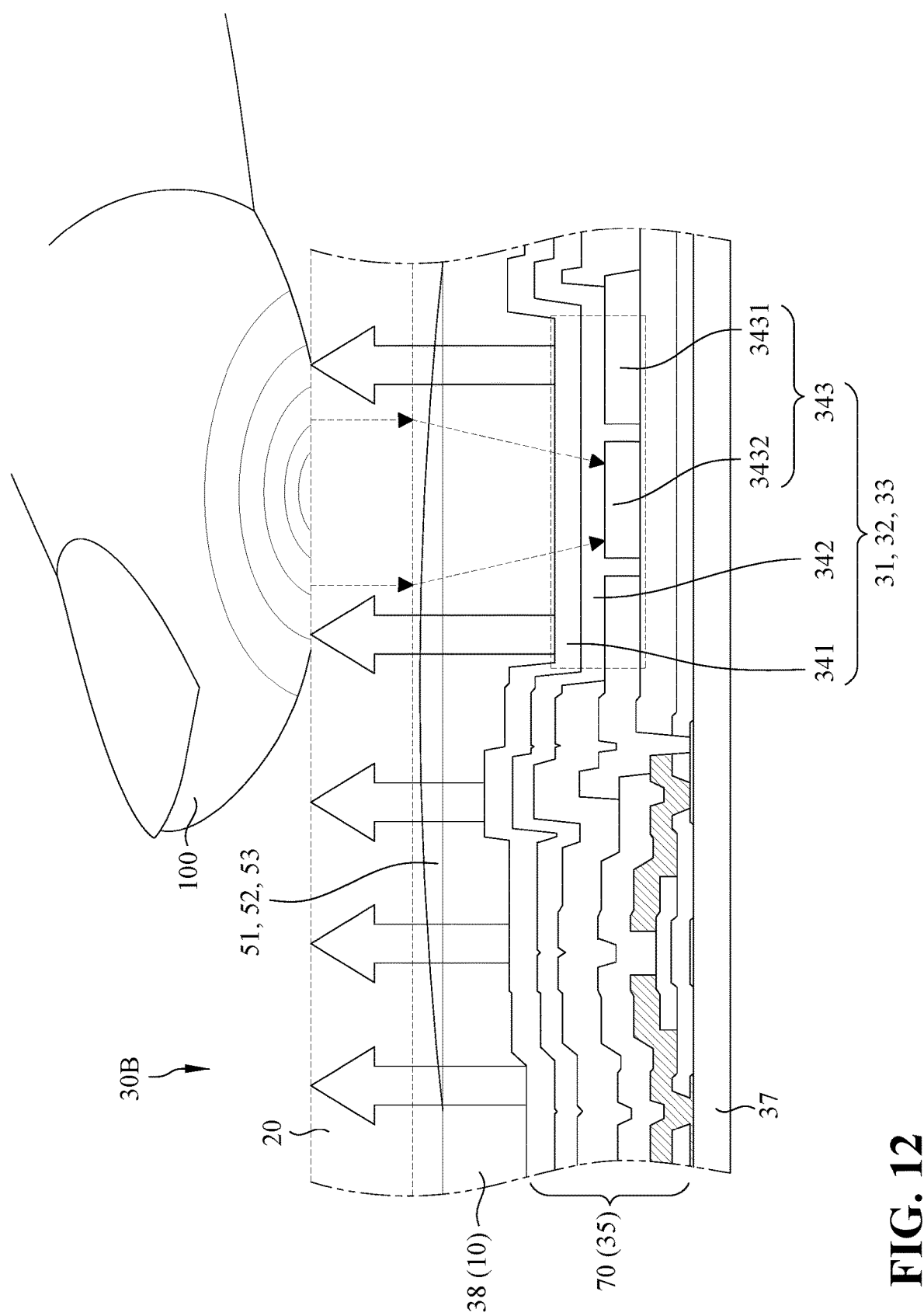
FIG. 12 is a schematic diagram of biometric recognition according to the second embodiment of the present invention.

FIG. 12 is a schematic diagram of biometric recognition according to the second embodiment of the present invention. As shown in FIG. 12, and also referring to FIGS. 2, 5 and 6, in the second embodiment, when the full-screen display device of the present invention performs biometric recognition, the light-emitting layer 3424 of the unit pixels 31, 32, 33 of the light-emitting area 60 emits the incident light upwardly. The incident light passes upwardly through the encapsulation layer 38 (i.e., the water-oxygen barrier layer 10) and scatters outwardly through the lens. The scattered incident light passes through the protective panel 20 and is reflected by a test object 100 to generate a reflected light. The reflected light passes through the protective panel 20 and then enters the lenses 51, 52, 53. The lenses 51, 52, 53 converge the reflected light, and the converged reflected light travels along the converged light path 54 of each lens 51, 52, 53, to pass through the encapsulation layer 38 (i.e., the water-oxygen barrier layer 10) to be received by the light-sensing layer 3432 of each unit pixel 31, 32, 33 as the light-sensing area 61 and converted into an image electrical signal.

Figure 13:
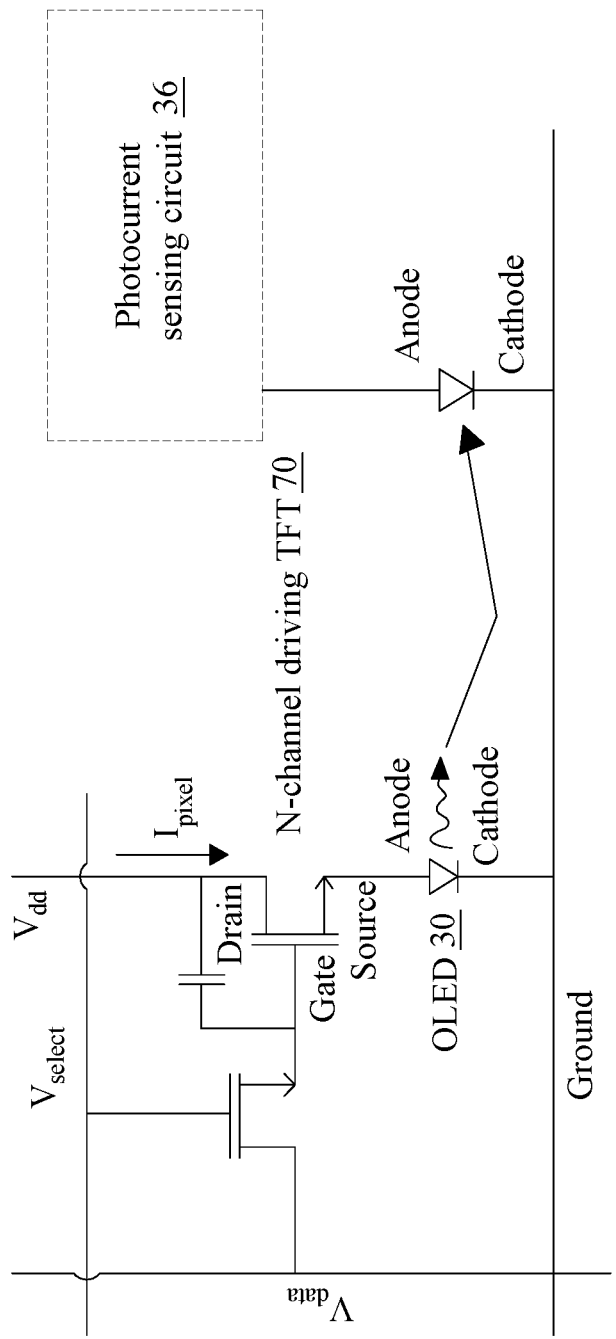
FIG. 13 is a circuit diagram for biometric recognition according to the first and second embodiments of the present invention.

FIG. 13 is a circuit diagram for biometric recognition according to the first and second embodiments of the present invention. As shown in FIG. 13, and also referring to FIGS. 5, 6, 9 and 11, the first and second embodiments use the N-channel driving TFT 70 as the driving circuit 35 to drive, through the internal circuit configuration, the light-emitting layer 3424 of each unit pixel 31, 32, 33 in the light-emitting area 60 to emit light, and the photocurrent sensing circuit 36 drives the light-sensing layer 3432 of each unit pixel 31, 32, 33 in the light-sensing area 61 to receive the reflected light. As shown in FIG. 13, when the full-screen display device of the present invention performs biometric recognition, the voltage equation is as follows: $V_{data}=V_{GS}(\text{driver})+V_{OLED}$; where $V_{data}$ is a data electrode voltage, and Vas is the voltage difference between the gate and the source of the driving transistor, driver is the driving circuit 35, and $V_{OLED}$ is the voltage of the organic light-emitting diode 30. In addition, the $V_{select}$ shown in FIG. 13 is a selection voltage, the $V_{dd}$ shown in FIG. 13 is an internal operating voltage of the device, and the $I_{pixel}$ shown in FIG. 13 is the current of a unit pixel.

Figure 14:
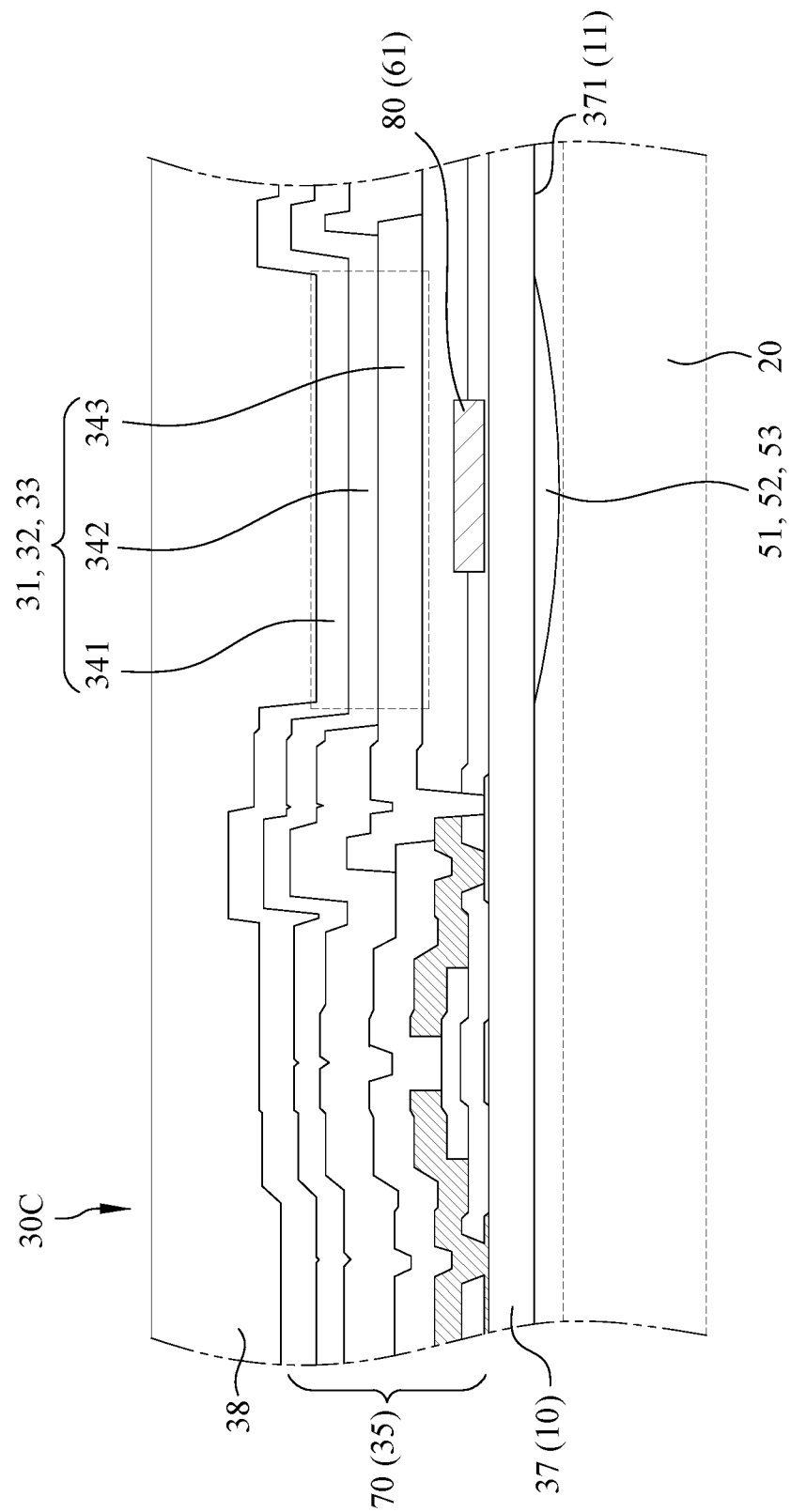
FIG. 14 is a cross-sectional view of the third embodiment of the present invention.

FIG. 14 is a cross-sectional view of the third embodiment of the present invention. As shown in FIG. 14, the differences between the third embodiment and the first embodiment are that: first, the anode 343 of the unit pixels 31, 32, 33 does not include a light-sensing layer 3432; second, the anode 343 of the unit pixels 31, 32, 33 is electrically connected to the driving circuit 35 (see FIG. 18); third, the full-screen display device of the present invention further includes a plurality of photodiodes 80, and the photodiodes 80 are arranged below the unit pixels 31, 32, 33, electrically connected to the photocurrent sensing circuit 36 (see FIG. 18), and defined as the light-sensing area 61. Except for these, the remaining technical features of the third embodiment are exactly the same as those of the first embodiment. Therefore, the organic light-emitting diode 30C of the third embodiment is the downward-emitting type.

Figure 15:
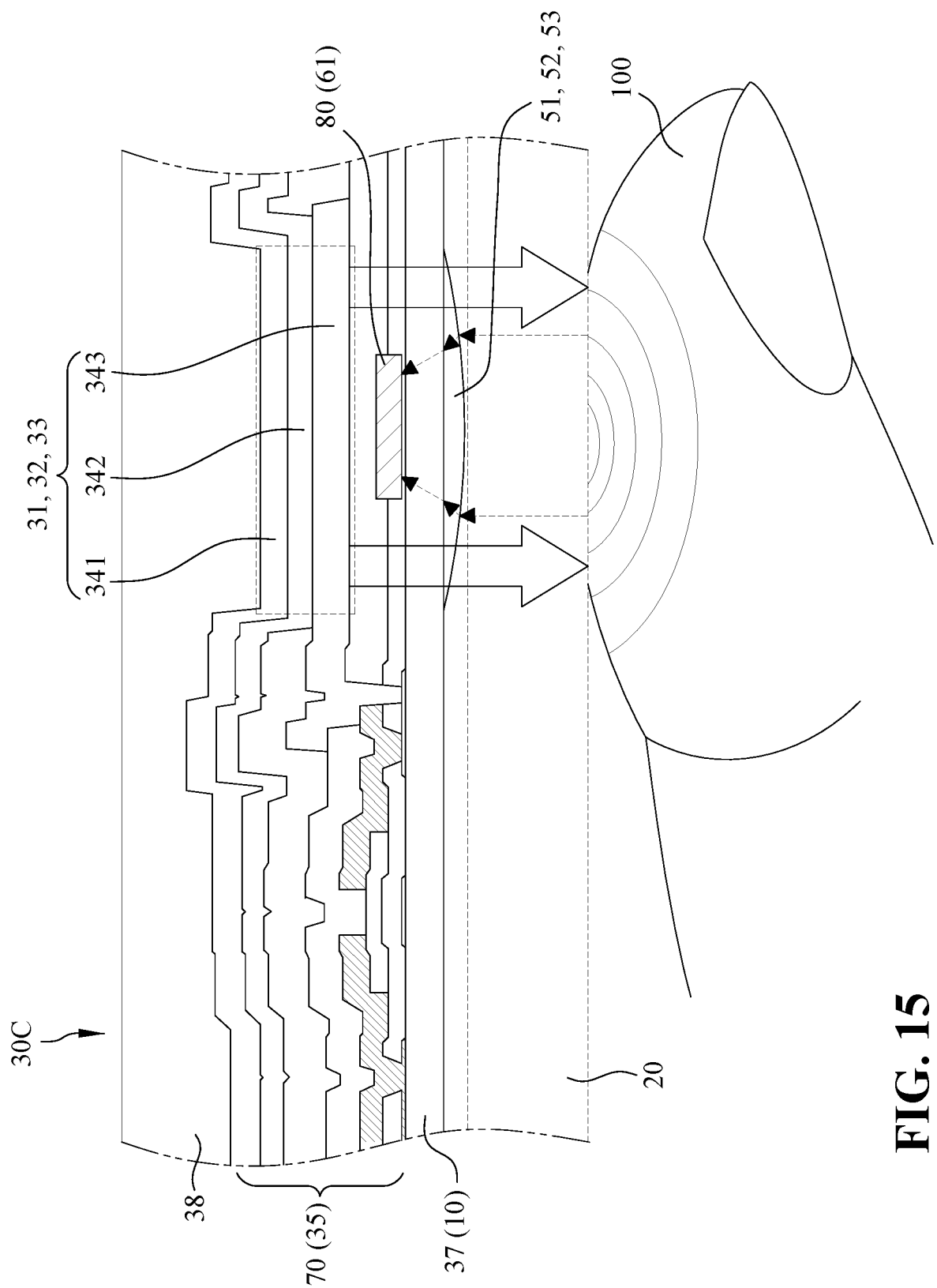
FIG. 15 is a schematic diagram of biometric recognition according to the third embodiment of the present invention.

FIG. 15 is a schematic diagram of biometric recognition according to the third embodiment of the present invention. As shown in FIG. 15, in the third embodiment, when the full-screen display device of the present invention performs biometric recognition, the light-emitting layer 3424 of the unit pixels 31, 32, 33 of the light-emitting area 60 emits the incident light downwardly (see FIG. 5), and the incident light passes downwardly through the substrate 37 (i.e., the water-oxygen barrier layer 10) and scattered outwardly through the lenses 51, 52, 53. After passing through the protective panel 20, the scattered incident light is reflected by a test object 100 to generate a reflected light. After passing through the protective panel 20, the reflected light enters and is converged by each lens 51, 52, 53. The reflected light passes through the substrate 37 (i.e., the water-oxygen barrier layer 10) along the converged light path 54 of each lens 51, 52, 53 and is then received by the photodiodes 80 as the light-sensing area 61 and converted into an image electrical signal.

As shown in FIG. 15, preferably, the photodiodes 80 are respectively arranged on the converged light paths of the lenses 51, 52, 53 and close to the centers of the unit pixels 31, 32, 33. Therefore, the wavelength of external ambient light and the wavelength of the signal light in the light-emitting area 60 will be absorbed by the light-shielding layer 40 (see FIG. 1), thereby reducing the crosstalk caused by reflection and diffusion of external ambient light and the signal light in the light-emitting area 60. As such, only the converged reflected light will be focused on the photodiode 80 as the light-sensing area 61 along the converged light path of each lens 51, 52, 53, thereby improving the signal-to-noise ratio (SNR).

Preferably, each photodiode 80 is a photosensitive element of amorphous silicon (a-Si:H) or polycrystalline silicon (poly-Si), amorphous silicon (a-Si:H) or polycrystalline silicon (poly-Si). The photosensitive element has particularly excellent light-sensing effect and is suitable as the light-sensing area 61. However, the material of the photodiode 80 is not limited therein.

Preferably, when each photodiode 80 is a photosensitive element of amorphous silicon (a-Si:H) or polycrystalline silicon (poly-Si), the full-screen display device of the present invention further includes an infrared cutoff sheet (not shown). The infrared cutoff sheet is disposed on the inner side of the protective panel 20 (i.e., the side close to the water-oxygen barrier layer 10). The infrared cutoff sheet can be used to reflect or absorb incident light in the near-infrared band to prevent the incident light in the infrared band from being transmitted to the photodiode 80 and affecting the photodiode 80, thereby preventing overexposure under strong light.

Figure 16:
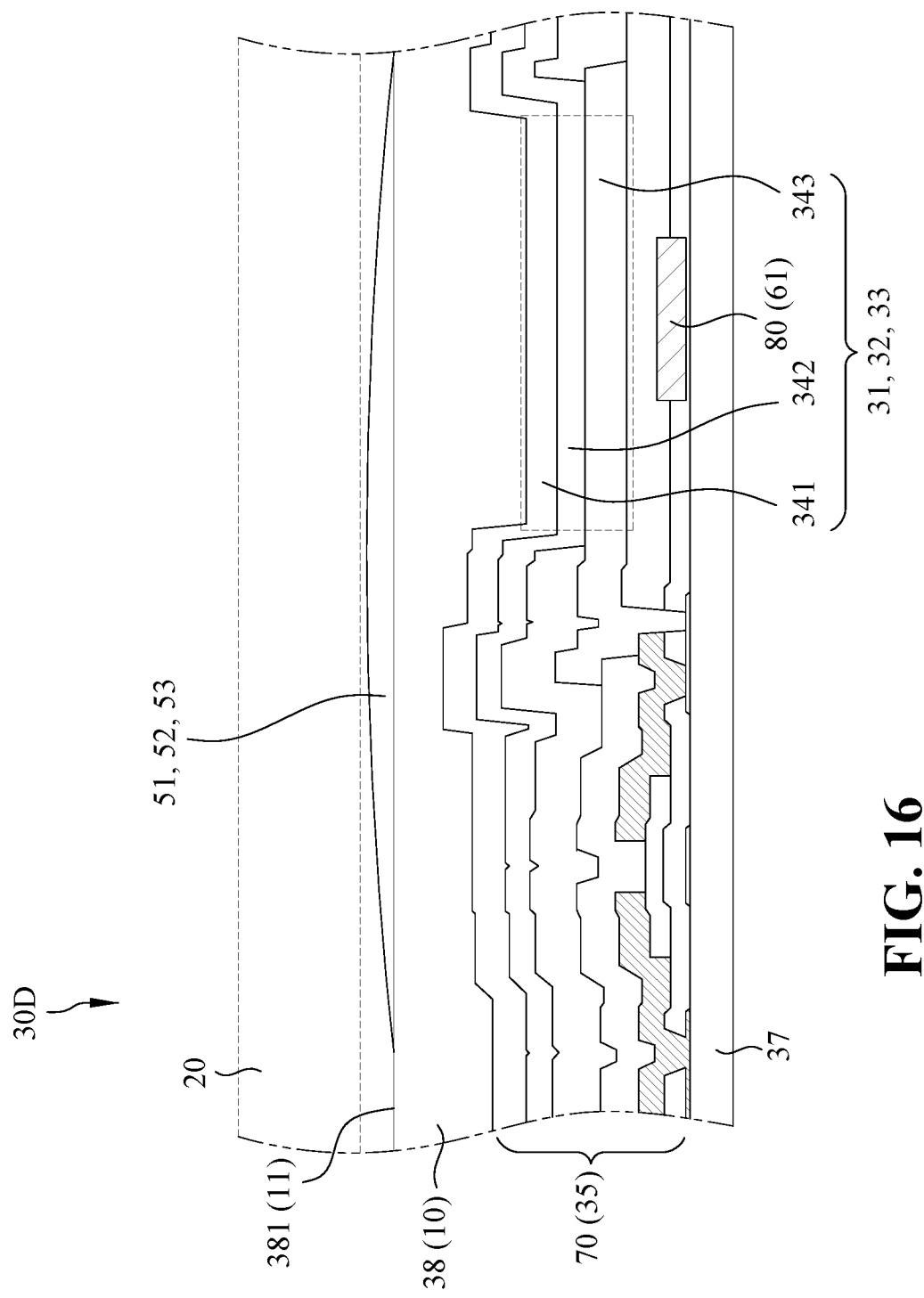
FIG. 16 is a cross-sectional view of the fourth embodiment of the present invention.

FIG. 16 is a cross-sectional view of the fourth embodiment of the present invention. As shown in FIG. 16, the differences between the fourth embodiment and the third embodiment are that the encapsulation layer 38 serves as the water-oxygen barrier layer 10, the protective panel 20 is disposed above the encapsulation layer 38, the light-shielding layer 40 (not shown) and the lenses 51, 52, 53 are disposed on a top surface 381 of the encapsulation layer 38 (i.e., the first surface 11 of the water-oxygen barrier layer 10). Therefore, the OLED 30D of the fourth embodiment is the upward-emitting type.

Figure 17:
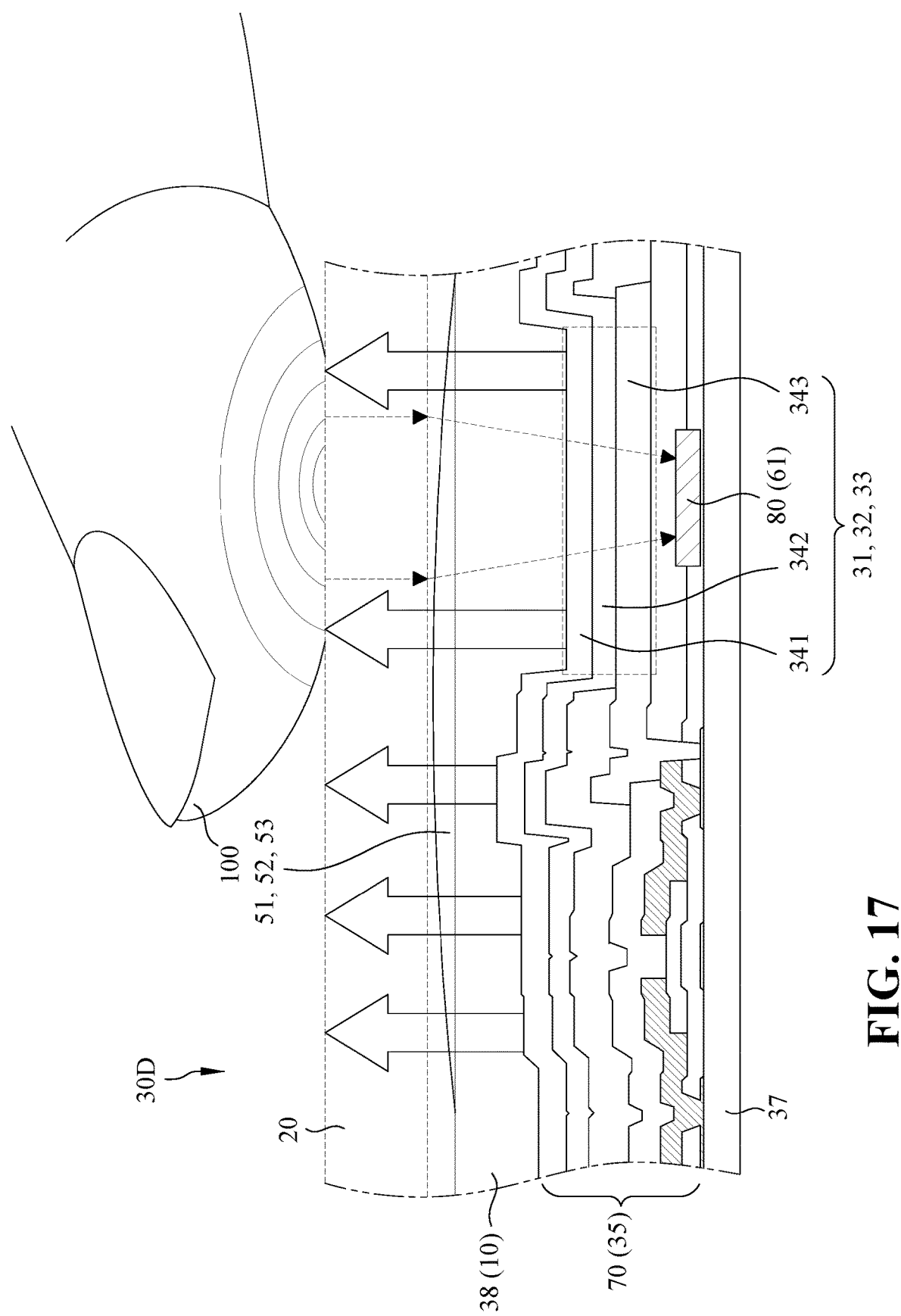
FIG. 17 is a schematic diagram of biometric recognition according to the fourth embodiment of the present invention.

FIG. 17 is a schematic diagram of biometric recognition according to the fourth embodiment of the present invention. As shown in FIG. 17, in the fourth embodiment, when the full-screen display device of the present invention performs biometric recognition, the light-emitting layer 3424 of the unit pixels 31, 32, 33 of the light-emitting area 60 emits the incident light upwardly (see FIG. 5). The incident light passes upwardly through the encapsulation layer 38 (i.e., the water-oxygen barrier layer 10) and scatters outwardly through the lens. The scattered incident light passes through the protective panel 20 and is reflected by a test object 100 to generate a reflected light. The reflected light passes through the protective panel 20 and then enters the lenses 51, 52, 53. The lenses 51, 52, 53 converge the reflected light, and the converged reflected light travels along the converged light path 54 of each lens 51, 52, 53, to pass through the encapsulation layer 38 (i.e., the water-oxygen barrier layer 10) to be received by the photodiodes 80 as the light-sensing area 61 and converted into an image electrical signal.

Figure 18:
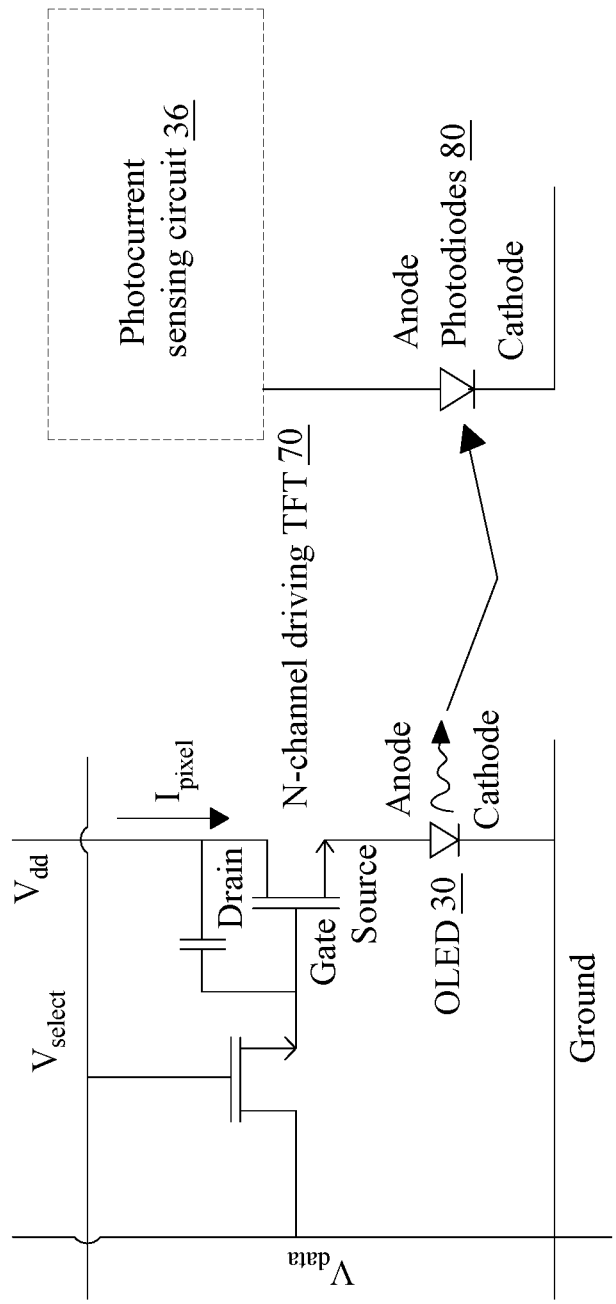
FIG. 18 is a circuit diagram for biometric recognition according to the third and fourth embodiments of the present invention.

FIG. 18 is a circuit diagram for biometric recognition according to the third and fourth embodiments of the present invention. As shown in FIG. 18, and also referring to FIG. 14 and FIG. 16, the third and fourth embodiments use an N-channel driving TFT 70 as the driving circuit 35 to drive, through the internal circuit configuration, the light-emitting layer 3424 of each unit pixel 31, 32, 33 in the light-emitting area 60 to emit light (see FIG. 5), and the photocurrent sensing circuit 36 drives the photodiodes 80 to receive the reflected light. As shown in FIG. 18, when the full-screen display device of the present invention performs biometric recognition, the voltage equation is as follows: $V_{data}=V_{GS}$(driver)+$V_{OLED}$; where $V_{data}$ is a data electrode voltage, and $V_{GS}$ is the voltage difference between the gate and the source of the driving transistor, driver is the driving circuit 35, and $V_{OLED}$ is the voltage of the organic light-emitting diode 30. In addition, the $V_{select}$ shown in FIG. 18 is a selection voltage, the $V_{dd}$ shown in FIG. 18 is an internal operating voltage of the device, and the $I_{pixel}$ shown in FIG. 18 is the current of a unit pixel.

In summary, the full-screen display device of the present invention can emit the incident light through the internal light-emitting area 60 of each unit pixel 31, 32, 33, and then converge the reflected light to the internal or external light-sensing areas 61 of the same unit pixels 31, 32, 33 through each lens 51, 52, 53 to enable each unit pixel 31, 32, 33 to have the functions of emitting light and receiving light. Furthermore, the difference in size of the light-sensing area 61 can block the crosstalk of biometric features, thereby obtaining clear biometric images. As such, the full-screen display device of the present invention can provide half-screen or full-screen large-area optical biometric recognition technology to realize the full-screen biometric pressing function.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A full-screen display device with unit pixels having function for transmitting and receiving light, comprising:
 a water-oxygen barrier layer;
 a protective panel, disposed above the water-oxygen barrier layer;
 an organic light-emitting diode (OLED), disposed on a first surface of the water-oxygen barrier layer and comprising a plurality of unit pixels, each unit pixel having a cathode, an electron injection layer, an electron transport layer, a hole blocking layer, a light-emitting layer, a hole transport layer, a hole injection layer, and an anode, the light-emitting layer defining a light-emitting area, the anode having a driving layer and a light-sensing layer, the driving layer being electrically connected to a driving circuit, the light-sensing layer being electrically connected to a photocurrent sensing circuit and defining a light-sensing area;
 a light-shielding layer, disposed on a second surface of the water-oxygen barrier layer and having a plurality of openings to expose at least part of each of the unit pixels; and
 a plurality of lenses, disposed on the second surface of the water-oxygen barrier layer and located in the openings;
 wherein, when the full-screen display device performs biometric recognition, the light-emitting area emits an incident light, the incident light passing through the water-oxygen barrier layer and scattering outwardly through at least one of the lenses, and the scattered incident light passing through the protective panel and then reflected by a test object to generate a reflected light; the reflected light passing through the protective panel, entering at least one of the lenses and being converged; and the converged reflected light travels along a converged light path and passes through the water-oxygen barrier layer to be received by the light-sensing area and converted into an image electrical signal.

2. The full-screen display device according to claim 1, wherein each lens is a microlens or a meta-lens.

3. The full-screen display device according to claim 2, wherein a size of the light-sensing area is obtained through the following conditions: (1) a curved surface of the microlens is a spherical surface, an aspherical surface or an asymmetric free-form surface, or the meta-lens comprises a nanometer microstructure;

$$\left(\frac{B}{A}\right) \times 0.001 \text{ mm} < D < \left(\frac{A}{B}\right) \times 1000 \text{ mm}; \quad (2)$$

$$\left(\frac{B}{3.5 \times A}\right) \times 0.001 \text{ mm} < H < \left(\frac{7.0 \times A}{B}\right) \times 10 \text{ mm}; \quad (3)$$

$$0.00005 < \frac{B}{A} < 0.99995; \quad (4)$$

$$\left(\frac{B}{A}\right) \times 0.001 \div \sqrt{2} \text{ mm} < R < \left(\frac{A}{B}\right) \times 1000 \text{ m}; \text{ and} \quad (5)$$

$$Z2 \leq Z1; \quad (6)$$

where A is the size of a unit pixel, B is the size of the light-sensing area, D is the thickness of the water-oxygen barrier layer, H is the height of the microlens, R is a curvature of the microlens, and Z1 is a diameter of the microlens, and Z2 is a diameter of each opening.

4. The full-screen display device according to claim 1, wherein the driving layer is arranged around an outside of the light-sensing layer along a circumferential direction, and the light-sensing layer is arranged on the converged light path and is located on a center of the driving layer.

* * * * *